United States Patent [19]

Safholm

[11] 4,039,048
[45] Aug. 2, 1977

[54] APPARATUS FOR LUBRICATING OR CLEANING SHEATHED CABLES

[76] Inventor: Alwyn K. Safholm, 340 Kent Ave., Kentfield, Calif. 94904

[21] Appl. No.: 607,027

[22] Filed: Aug. 22, 1975

[51] Int. Cl.² .............................................. F16N 7/14
[52] U.S. Cl. ...................................... 184/15 R; 74/230
[58] Field of Search ................... 184/15 R, 15 A, 14, 184/55 R; 74/230; 118/408, 421; 134/102, 166 C, 167 C, 168 C, 169 C

[56] References Cited
U.S. PATENT DOCUMENTS

| 2,367,721 | 1/1945 | Gothberg et al. | 184/55 R |
| 3,268,032 | 8/1966 | Dannels | 184/15 R X |
| 3,516,517 | 6/1970 | Kuhlman | 184/55 R |
| 3,731,764 | 5/1973 | Workman | 184/15 R |
| 3,889,781 | 6/1975 | Schott | 184/15 R |

Primary Examiner—Harland S. Skogquist
Assistant Examiner—William R. Browne

Attorney, Agent, or Firm—Flehr, Hohbach, Test, Albritton & Herbert

[57] ABSTRACT

Apparatus is disclosed for lubricating and/or cleaning out sheathed cable assemblies. The apparatus includes a housing which defines a reservoir for containing a lubricating medium. A hollow cylindrical jacket is mounted above an opening in the upper wall of the housing. Within the jacket a packing plug is mounted in assembled relationship about the sheath with the lower end of the plug disposed adjacent an upwardly diverging frusto-conical surface. The plug is compressed into fluid-tight sealing contact about the sheath by means of a packing nut which is threadable engaged in the upper end of the jacket. A washer disposed between the packing nut and plug provides a bearing surface for the nut. An air valve is mounted in the housing for receiving a charge of gas under pressure which forces oil from the reservoir through the clearance between the cable and sheath.

4 Claims, 3 Drawing Figures

U.S. Patent  Aug. 2, 1977  4,039,048
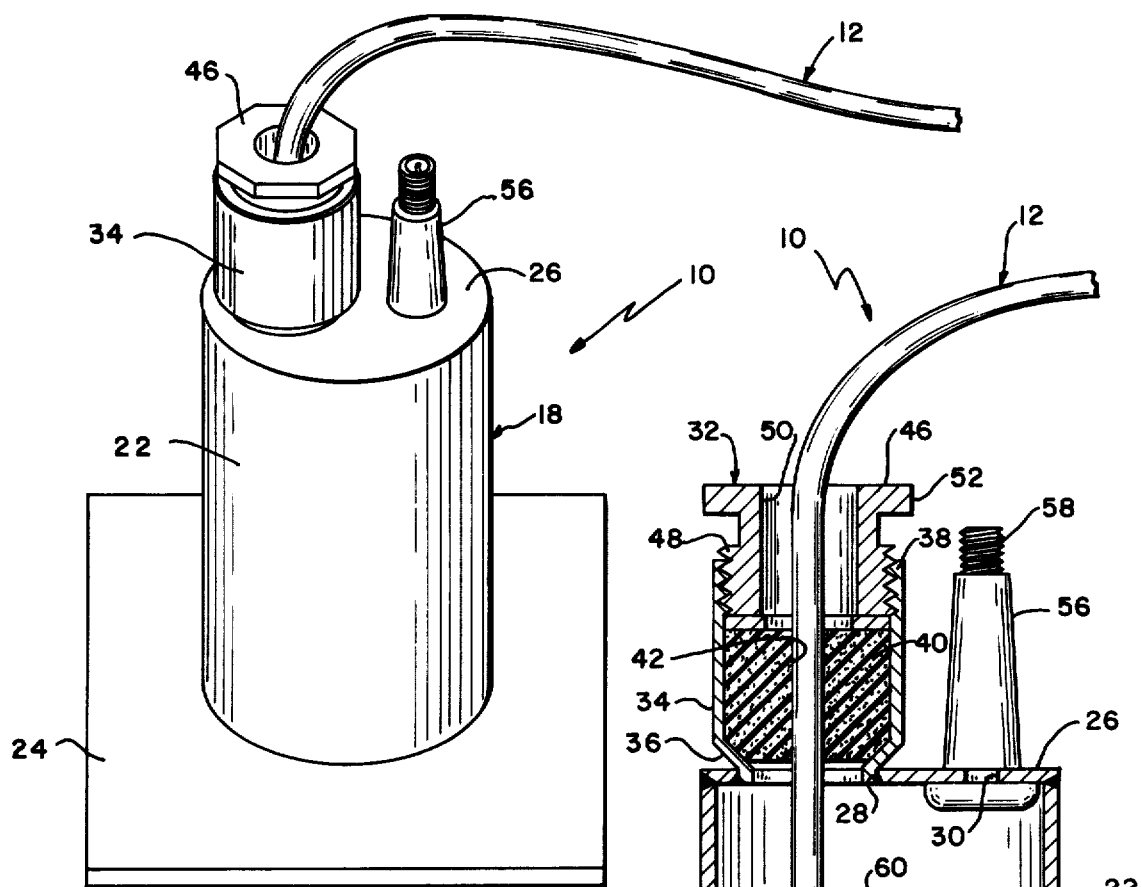
FIG.—1
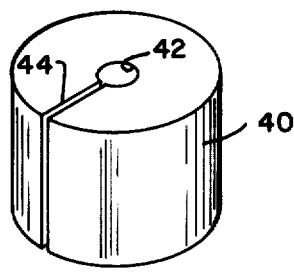
FIG.—3
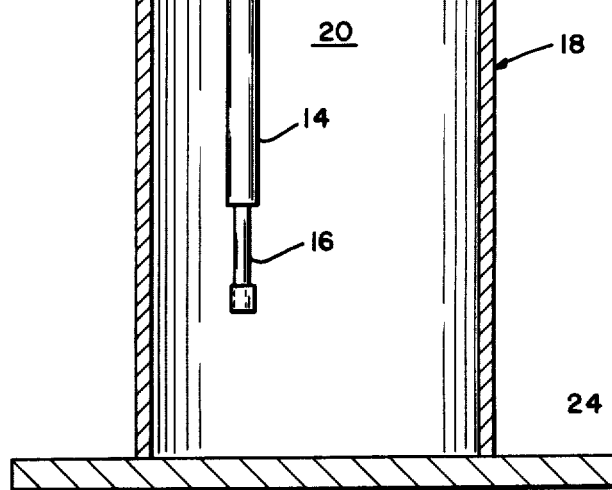
FIG.—2

APPARATUS FOR LUBRICATING OR CLEANING SHEATHED CABLES

BACKGROUND OF THE INVENTION

This invention relates in general to the lubrication of flexible cable assemblies of the type having a cable mounted for movement within a sheath.

Flexible cable assemblies of the type described are used in various applications such as for motorcycles, automobiles, boats, airplanes or other mechanical apparatus. In such cable assemblies the cable is operated with rotary or linear movement in its sheath to provide control at a remote location. When initially installed the cables are normally charged with the desired lubricating medium which is effective for only a finite time period, afterwhich the cable must be relubricated for proper operation. Certain conventional cable assemblies are designed to be relubricated by means such as oil fittings, which are expensive, or with oiling holes. However, either the oil fittings or oil holes can become clogged so that any attempt to relubricate is ineffective. In many instances the cables are located in relatively inaccessible places so that it is difficult, inconvenient and time consuming to relubricate. The result is that proper maintenance of the cables is in many cases delayed or not carried out at all and this leads to malfunction and eventually failure of the cable.

In certain applications, e.g., for motorcycles, the cables are exposed to water and other foreign matter such as dirt and sand. Over a period of time the cables gradually become filled with dirt, sand, rust, and oil sludge. In many cases the cables become clogged or jammed to the extent that they are inoperative. Presently there is no simple and effective method for cleaning out and freeing the jammed cables so that it has become commonplace to merely throw away and replace the jammed cables with completely new assemblies. To avoid this expense, it would be desirable to provide a convenient lubricating means which would also serve to clean out and free jammed cables.

OBJECTS AND SUMMARY OF THE INVENTION

It is a general object of the invention to provide new and improved apparatus for lubricating and cleaning out flexible sheathed cable assemblies.

Another object is to provide apparatus of the type described which is relatively simple and inexpensive in design and construction and which permits convenient and rapid lubrication of the cable assemblies.

Another object is to provide apparatus of the type described which can be used to lubricate or clean out assemblies of varying outer diameters.

Another object is to provide cable lubricating apparatus which is of small overall size so that it is portable and which can be operated from any various sources of pressurized gas to facilitate lubricating or freeing jammed cables on motorcycles, automobiles, boats, airplanes and other mechanical apparatus.

The invention in summary includes a housing which defines a fluid reservoir for containing the lubricating medium. A cylindrical sealing member or packing plug is formed with a bore and is split along one side to permit it to be mounted about the sheath of a cable assembly. The sealing member is adapted for insertion into a packing jacket which is mounted above an opening formed in the top wall of the housing. A packing nut is threadably engaged with the jacket for compressing the sealing member against a frusto-conical surface so that a fluid-tight seal is formed about the outer surface of the sheath. A washer between the packing nut and the sealing member provides a bearing surface for the nut. A gas such as air under pressure is injected into the reservoir through a one-way valve so that the contained lubricating medium is forced upwardly through the end of the cable assembly which is disposed within the reservoir.

The foregoing and additional objects and features of the invention will become apparent from the following description in which the preferred embodiments of the invention have been set forth in detail in conjunction with the accompanying drawings.

BRIEF DESCRIPTION OF THE DRAWINGS

FIG. 1 is a perspective view of a cable lubricating apparatus made in accordance with the invention.

FIG. 2 is an axial section view of the apparatus of FIG. 1.

FIG. 3 is a perspective view to an enlarged scale of the packing plug of the apparatus of FIGS. 1 and 2.

DESCRIPTION OF THE PREFERRED EMBODIMENT

In the drawings FIG. 1 illustrates generally at 10 apparatus of the invention for lubricating or cleaning out flexible sheathed cable assemblies. In the drawings apparatus 10 is illustrated as in use with a typical cable assembly 12 which comprises an elongate sheath 14 within which a flexible cable 16 is mounted for axial and/or rotary motion.

Apparatus 10 includes a housing 18 defining a closed reservoir 20 for containing the desired lubricating medium such as a light oil, e.g., WD 40 grade oil or the like. Housing 18 comprises a hollow cylindrical wall 22, which can be a metal pipe having dimensions of 2 inches O.D. and 6 inches in length. The lower end of the pipe is mounted by welding onto a rectangular metal base plate 24. The upper end of the pipe is closed by means of a circular end plate 26 through which a large diameter circular opening 28 and smaller diameter opening 30 are formed.

A packing unit 32 is mounted on the housing above opening 28 in the end plate for receiving the end of the sheathed cable 12 which projects into the reservoir when the lubricator apparatus is in use. The packing unit comprises a hollow cylindrical jacket 34 formed at its lower end with an upwardly diverging frusto-conical surface 36 and which is mounted as by welding onto the end cover about the opening 28. Female threads 38 are formed within the upper portion of the jacket.

A cylindrical sealing member or packing plug 40 is mounted within jacket 34 for forming a fluid-tight seal about the outer surface of sheath 14. The packing plug is illustrated in detail in FIG. 3 and comprises a cylinder formed of a suitable resilient sealing material such as Neoprene rubber or the like. An axial bore 42 is formed through the plug and the bore is sized with a diameter commensurate generally with the outer diameter of the sheath of the cable assembly which is to be lubricated. A number of different packing plugs having bores of varying diameters can be provided to permit apparatus 10 to be used with cable assemblies having a range of outer diameters. An axial slot 44 is cut through one side of the plug and extends into the bore so that the plug can be spread apart to facilitate inserting the sheath sideways into bore prior to lubrication, and also to permit the sheath to be withdrawn following lubrication.

Means is provided for compressing plug 40 within the jacket and this means includes a packing nut 46 formed at its lower end with male threads 48 adapted for engaging the female threads of the jacket. An axial bore 50 is formed through the nut for permitting insertion and removal of the cable. The upper end of the nut is formed with an eight-sided shoulder 52 adapted for receiving a suitable wrench or other tool for turning the nut into and out of the jacket. A packing washer 54 is mounted between the lower end of the packing nut and the upper end of the plug and this washer serves as a bearing surface for the nut to transmit a compressive thrust force downwardly against the plug.

Means is provided for injecting a charge of pressurized gas such as air into reservoir 20. This means includes a suitable one-way air valve 56 mounted at its lower end on end plate 26 about opening 30. The upper end of the valve is formed with male threads 58 adapted for coupling with the fitting of an air hose which is connected with the source of gas pressure. The gas pressure preferably is in the range of 10 to 100 psi and is supplied from a suitable source such as a tire pump, air compressor, or an inflated tire in which case a jumper hose would be connected between the air valve of the tire and air valve 56. The magnitude of gas pressure supplied into the reservoir would vary as required by the particular requirements. The lower air pressures of 10 psi and above would generally be adequate for relubricating purposes while the higher pressures of up to 100 psi would in many cases by required for freeing clogged cables, depending upon the condition of the cables.

The use and operation of the invention is as follows. With packing plug 40, washer 54, and nut 46 removed from jacket 34 the reservoir is filled with the desired lubricating oil through opening 28 up to a level 60 spaced below end cover 26. One end of the cable assembly 12 which is to be lubricated is then inserted through the bore of packing nut 46. A packing plug 40 having a bore diameter commensurate with the outer diameter of cable sheath 14 is selected and mounted about the sheath by either sliding the sheath through the plug bore or inserting it sideways through the slot 44. Washer 54 is then slipped over the end of the sheath, and the end of the cable is then inserted into the reservoir through jacket 34 until the open end of the sheath is spaced below oil level 60. The packing plug is then slipped along the sheath and into the jacket. The nut and washer are then slipped along the sheath and into the jacket and the nut is screwed into the threads 38. A wrench is applied to the nut which is tightened sufficient to compress the plug. Because the outer diameter of the plug is constrained by the jacket, the plug bore is compressed radially inwardly into tight sealing contact with the outer surface of the sheath. At the same time the lower end of the plug is compressed against frusto-conical surface 36 which wedges the plug tightly against the sheath. Fluid-tight seals are thus created between the sheath and plug bore as well as between the outer surface of the plug and jacket. The tightly compressed plug also serves to firmly hold the lower end of the cable so that it projects within the oil reservoir during the lubrication operation. The fitting from the air supply hose is then coupled to air valve 56 and a charge of air under pressure is injected into the reservoir. This charge forces oil upwardly through the spacing between the cable and sheath. When oil is observed to be emerging from the opposite end of the cable the air pressure is released by either uncoupling the air hose from valve or by shutting the air supply from its source. Packing nut 46 is then unscrewed and the cable assembly is pulled up out of the reservoir carrying with it the packing plug and washer which are removed from the sheath. The lubricated cable is now ready for reinstallation.

While the foregoing embodiment is at present considered to be preferred it is understood that numerous variations and modifications may be made therein by those skilled in the art and it is intended to cover in the appended claims all such variations and modifications as fall within the true spirit and scope of the invention.

What is claimed is:

1. Apparatus for lubricating or cleaning out a cable assembly having a cable carried within an elongate sheath, the apparatus comprising the combination of a housing defining a fluid reservoir, means forming an opening in the housing, means forming a hollow cylindrical sealing member having an axial bore with an inner diameter commensurate generally with the outer diameter of said sheath, said sealing member being axially split along at least one side thereof and being formed of a resilient material which is capable of being compressed, a hollow cylindrical resilient jacket means mounted on the housing about the opening for acting on the sheathed cable extending through the apparatus, said jacket means having an inner diameter sized commensurate with the outer diameter of the sealing member and with the sealing member being mounted within the jacket in co-axial alignment with the opening, means in said jacket means for compressing the sealing member lengthwise along its longitudinal axis for bulging causing of the sealing member so that its outer cylindrical surface is forced radially outwardly into sealing contact with the jacket means and the wall of the bore is caused to be forced radially inwardly into sealing contact about the sheath, and one-way gas valve means mounted in an upper portion of the housing for injecting a charge of gas under pressure into the reservoir for forcing fluid therefrom along a path within the sheath through the latter's open end.

2. Apparatus for lubricating or cleaning out a cable assembly having a cable carried within an elongate sheath, the apparatus comprising the combination of a housing defining a fluid reservoir, means forming an opening in the housing, means forming a hollow cylindrical sealing member having an axial bore with an inner diameter commensurate generally with the outer diameter of said sheath, said sealing member being axially split along at least one side thereof and being formed of a resilient material which is capable of being compressed, a hollow cylindrical resilient jacket mounted on the housing about the opening, jacket means for mounting the sealing member in co-axial alignment with the opening, means for compressing the sealing member for causing its bore to move into fluid-sealing contact with the outer surface of the sheath when an open end thereof is mounted through the sealing member and projecting into the reservoir, said compressing means including a packing nut removably mounted for threading engagement within the jacket means, said packing nut being formed with an axial bore for receiving the sheath, said packing nut being releasable from the jacket means to facilitate mounting of the sealing member about the sheath with the sealing member thereafter being compressed in the jacket means upon threading engagement with the packing nut, and means for injecting a charge of gas under pressure into the reservoir for forcing fluid therefrom along a path within the sheath through the latter's open end.

3. Apparatus as in claim 2 which said jacket is formed at its juncture with the housing with a frusto-conical surface which diverges toward the sealing member whereby said compression of the sealing member causes an end thereof to be wedged between the frusto-conical surface and the sheath for establishing a fluid-tight contact therewith.

4. Apparatus as in claim 2 which includes an annular washer mounted co-axially of and between the packing nut and sealing member whereby the washer provides a bearing surface for receiving the thrust force of the packing nut as the latter is threaded into the jacket.

* * * * *